(12) United States Patent
Walser et al.

(10) Patent No.: US 6,463,763 B2
(45) Date of Patent: Oct. 15, 2002

(54) APPARATUS FOR STIRRING GLASS MELTS

(75) Inventors: Hermann Walser, Breitenwang (AT); Hans-Peter Martinz, Höfen (AT)

(73) Assignee: Plansee Tizit Aktiengesellschaft, Tirol (AT)

( * ) Notice: Subject to any disclaimer, the term of this patent is extended or adjusted under 35 U.S.C. 154(b) by 0 days.

(21) Appl. No.: 09/845,472

(22) Filed: Apr. 30, 2001

(65) Prior Publication Data

US 2002/0014093 A1 Feb. 7, 2002

(30) Foreign Application Priority Data

May 2, 2000 (AT) ........................................ 323/2000 U

(51) Int. Cl.$^7$ ................................................ C03B 5/18
(52) U.S. Cl. ..................... 65/178; 65/135.3; 65/374.11; 65/374.12; 366/343
(58) Field of Search ............................... 65/135.3, 178, 65/374.11, 374.12; 366/343

(56) References Cited

U.S. PATENT DOCUMENTS

| | | | | | |
|---|---|---|---|---|---|
| 2,968,487 | A | * | 1/1961 | Glynn | 65/178 |
| 3,850,606 | A | * | 11/1974 | Rough | 65/178 |
| 3,971,646 | A | * | 7/1976 | Rhodes | 65/135.3 |
| 3,988,138 | A | * | 10/1976 | Rough | 65/135.3 |
| 4,536,202 | A | * | 8/1985 | Perkins et al. | |
| 4,887,791 | A | * | 12/1989 | Tangari et al. | |

* cited by examiner

*Primary Examiner*—Michael Colaianni
(74) *Attorney, Agent, or Firm*—Morgan & Finnegan, L.L.P.

(57) ABSTRACT

The invention pertains to a stirrer apparatus for glass melts. A stirring element and a stirrer shaft are provided, each comprised of a metal or a metal alloy having a high melting point temperature. A drive shaft for the stirring element comprises a different metallic material, for example an ODS alloy on the basis of iron or nickel. The junction between the stirrer shaft and the drive shaft is located approximately in the region in which the level of the surface of the glass melt is located during use. The end portion of the drive shaft or the end portion of the stirrer shaft, which can be covered by the melt during use, are isolated by a platinum casing.

9 Claims, 2 Drawing Sheets

APPARATUS FOR STIRRING GLASS MELTS

BACKGROUND OF THE INVENTION

The present invention relates to a stirrer for glass melts, and more particularly to a stirrer comprising a stirring element and a drive shaft that are connected to one another mechanically, wherein the stirring element comprises a refractory metal or alloy, and the drive shaft comprises a non-refractory metal or alloy.

Stirring devices used for glass melts can face severe challenges. Increasing demand for glass products has focused attention on the cost and reliability of glass production processes and equipment. In industrial manufacture, glass melts are processed in melting ovens. The glass material is maintained in a melt phase by convective heat transfer, which is promoted by means of stirring devices. The mechanical reliability of the stirring device can act as a limiting factor on the time utilization of the processing equipment.

Higher production rates, resulting in lower costs, demand higher temperatures of the glass melt, which results in higher thermal stresses on the stirring devices. In addition, many specialized glass products require additives that can be particularly corrosive to the stirrer device. Finally, production specifications for glass products will not tolerate the transfer of any foreign material from the stirrer, as by erosion or the consequences of corrosion.

As a rule, the glass is melted in closed oven zones, wherein a hot corrosive gas atmosphere is formed above the melt. The stirrer for the glass melt, which is driven from outside the oven zone, passes through the lid of the oven zone and, together with the drive shaft, is primarily exposed to the oven's atmosphere, while the actual stirring element at the end of the drive shaft is exposed to the glass melt itself.

Thus the materials which are used for the glass stirrers have to withstand the corrosive environments of the oven's atmosphere and the glass melt. These environments are distinctly different in their corrosive nature from each other. Of course, the materials that are used are not permitted to contaminate the glass melt.

Platinum is a material that withstands all these different corrosive stresses and in no way contaminates the glass melt. The disadvantages of platinum reside in its extremely high cost. A stirrer whose surface consists entirely of platinum can therefore be used only to a limited extent in the manufacture of especially high grade glass, such as glass for the manufacture of television panels or, in the case of glass ceramic melts, for the manufacture of glass ceramic hobs and, even here, only in the form of hollow stirrer constructions or platinum-encased molybdenum cores.

Glass stirrers comprising ceramic materials readily withstand corrosion by the oven's atmosphere, but they are less resistant to the glass melt, and they can contaminate the glass melt with ceramic particles. In addition, ceramic materials are limited in the stirrer shapes into which they can be formed, and their resistance to thermal shock is extremely poor. Thus, ceramics are of limited value as materials for glass melt stirrers.

Refractory metals and their alloys are also in use for glass stirrers. Examples of common refractory metals include molybdenum, tantalum, tungsten, chromium, columbium and rhenium. Although the corrosion resistance of molybdenum with respect to the glass melt is good and the contamination of the glass melt is negligible for the majority of applications, molybdenum is extremely reactive to air/oxygen mixtures and aggressive gaseous media. In the case of glass stirrers comprising molybdenum, the drive shaft, which is located outside of the glass melt and in the corrosive atmosphere of the oven, has to be protected against corrosion by additional procedures.

One possibility for achieving this is described in German Patent No. DE 25 00 793 A, according to which the drive shaft of a glass stirrer which consists entirely of molybdenum is surrounded by a tube which comprises platinum or a platinum alloy and which is immersed in the melt, with a small separation between the drive shaft and the tube, wherein an inert gas flows through the intervening zone between the platinum tube and the molybdenum shaft.

A disadvantageous feature in this regard is that the total length of the drive shaft, which is exposed to the corrosive atmosphere of the oven, has to be encased by the platinum tube, and this makes such a glass stirrer very expensive. In addition, flushing with an inert gas also makes the glass manufacturing process more expensive, and leads to undesired bubble inclusions in the glass melt.

Another possibility for creating a glass stirrer, which exhibits good resistance to corrosion from the corrosive atmosphere of the oven and also to corrosion by the glass melt, comprises subdividing the glass stirrer, and constructing the parts from different materials as described in, e.g., U.S. Pat. No. 3,539,691. According to this document, the actual stirring element at the end of the stirrer shaft is preferably manufactured from molybdenum, and the drive shaft as far as the stirring element and including the section that is immersed in the glass melt, is manufactured from a different material, such as copper or an iron alloy.

A disadvantageous feature in the case of such a glass stirrer is that the interface between the two stirrer parts is located within the glass melt. The section of the drive shaft that is located within the glass melt is thus subject to aggressive corrosive attack and since this section of the drive shaft comprises the material that is primarily resistant to the corrosive atmosphere of the oven rather than corrosion from the glass melt, premature failure of the glass stirrer can result. In addition, the sections of the drive shaft which are immersed in the glass melt have to be cooled internally in order to continue ensuring adequate mechanical strength for the drive shaft even at the temperature of the glass melt.

SUMMARY OF THE INVENTION

It is an object of this invention to provide a stirrer apparatus for stirring a glass melt comprising a stirring element comprising an impeller and a shaft element, both made of a refractory metal or alloy as a first metal, a drive shaft constructed of a second non-refractory metal or alloy, said shaft element and said drive shaft each having an end portion, the end portion of the shaft element being adapted to mechanically attach to the end portion of the drive shaft, and a casing made of platinum and disposed over the end portion of the shaft element or the drive shaft over a length suitable to isolate said end portions against corrosive attack within a range of surface levels of the glass melt.

DETAILED DESCRIPTION OF THE PREFERRED EMBODIMENTS

Figure 1:
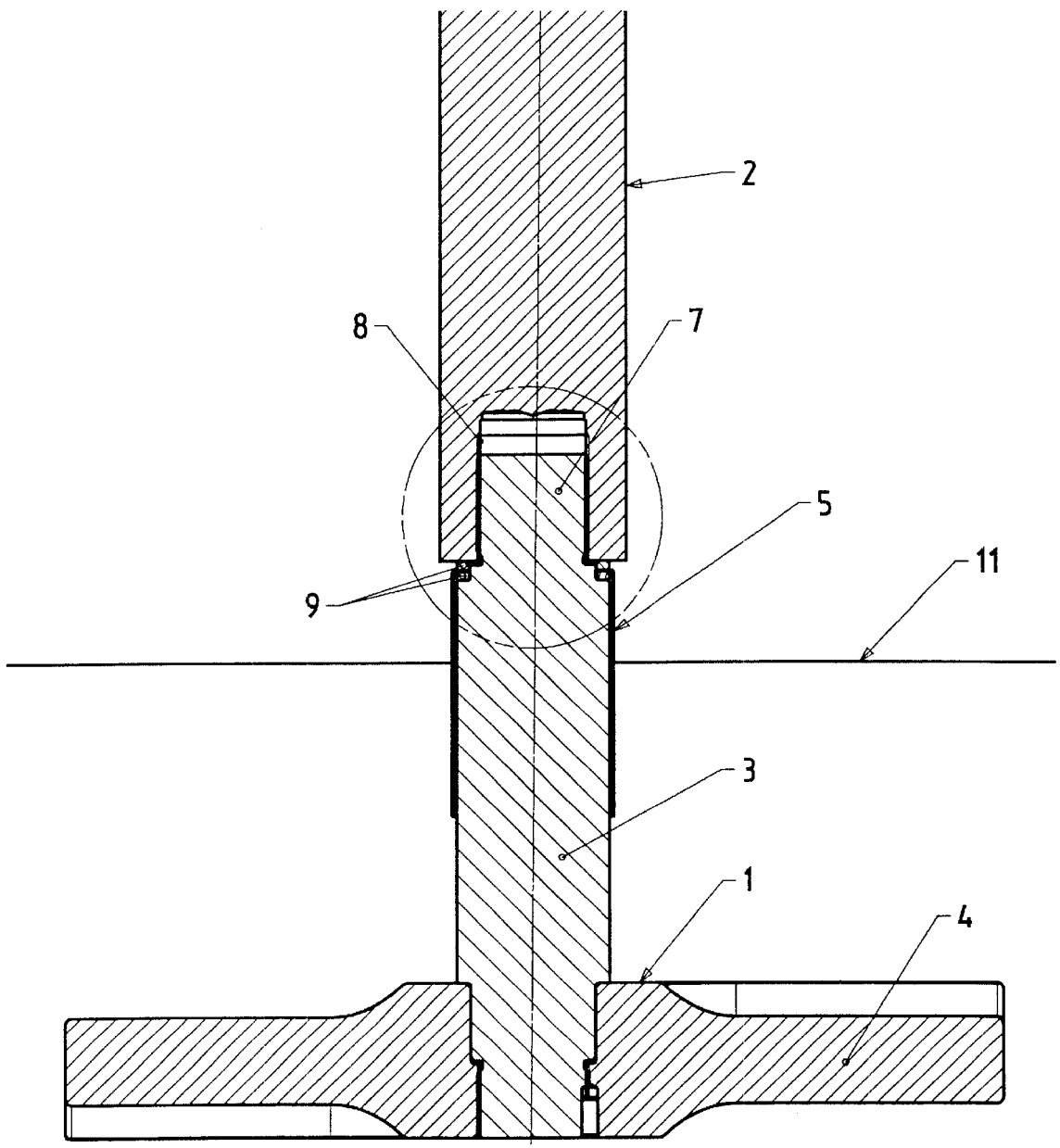
FIG. 1, is a section drawing, showing a stirrer apparatus for glass melts in accordance with one embodiment of the invention.

The present invention is directed to a glass stirrer apparatus that is beneficial in terms of cost but nevertheless exhibits excellent resistance to corrosion from both the atmosphere of the oven and the glass melt, resulting in a stirrer apparatus of superior mechanical characteristics and ensuring that no impermissible contamination of the glass melt thereby arises.

In accordance with the invention, this objective is achieved by a stirring element and a drive shaft. The stirring element is comprised of a stirrer shaft element and an impeller. The stirrer shaft element is fabricated from a refractory metal or alloy. In some preferred embodiments, the mechanical connection between the stirrer shaft element and the drive shaft, the junction, is located approximately at the level of the surface of the glass melt, and the end portions of the drive shaft and/or the stirrer shaft element are provided with a platinum casing over a length that encompasses the possible range of variation in the surface level of the glass melt. Fabricating the stirrer shaft element with a refractory material allows the junction between the drive shaft and the stirrer shaft element to be moved into the region above the level of the glass melt.

During operation, the level of the glass melt can change. This can result in contact of a length of the stirrer shaft element with the atmosphere of the oven. In order to avoid such contact, a length of the stirrer shaft and/or of the drive axis, which is located in the immediate vicinity of the junction, can be provided with a platinum casing. Since the variations in the level of the melt are not very large as a rule, the platinum casing can also be correspondingly short, so that the glass stirrer apparatus is very favorable in terms of cost.

In certain embodiments, the junction can be arranged in such a way that it is always located at an adequate distance above the level of the glass melt, with account being taken of the variations in the level of the glass melt. In this case, it is sufficient to provide only the end portion of the stirrer shaft element with platinum casing from the junction on down.

In alternate embodiments, the junction is located just below the normal level of the melt, and only the end portion of the drive shaft on up is provided with a platinum casing.

If the junction is located at the height of the normal level of the melt, then the end portions of both the drive shaft and the stirrer shaft element can be provided with a platinum casing.

In an especially advantageous embodiment of the invention, the material for the stirring element is molybdenum or a molybdenum alloy, and the material for the drive shaft is an Oxide Dispersion Strengthened ("ODS") alloy based on iron or nickel. Such materials result in optimum resistance to corrosion from both the glass melt and the oven's atmosphere.

In a further advantageous embodiment of the invention, the different materials of the drive shaft, the stirrer shaft element and the platinum casing are separated from one another by a diffusion barrier layer at their mutual points of contact. In this way, it is possible to prevent undesired mutual reaction of the different materials as a result of the action of the oven's atmosphere and the glass melt. The diffusion barrier layer can be applied in areas surrounding the points of contact of either or both of the surfaces in contact.

An aluminum oxide layer has proven to be especially valuable as such a diffusion barrier layer. Such a layer can be applied to the parts by known coating processes, such as chemical vapor deposition ("CVD") or plasma vapor deposition ("PVD") process.

In some preferred embodiments, the material for the drive shaft is an ODS alloy based on iron or nickel that contains aluminum as an alloying element. With this prerequisite, a stable, closed, superficial diffusion barrier layer comprising $Al_2O_3$ can be achieved at the end portion of the drive shaft solely by means of a controlled oxidation treatment without having to use additional expensive procedures for the application of the layer by means of coating devices.

In some embodiments of the invention, the end portion of the stirrer shaft element has a lug with an external thread at the junction with the drive shaft. This lug is screwed into an internally threaded recess in the drive shaft. Two ring-shaped seals, which are preferably ceramic, are placed in a shoulder comprising a notch in the stirrer shaft of the stirring element at the base of the lug. The flanged edge of a platinum casing, which encases the end portion of the stirrer shaft element or the drive shaft, is firmly clamped between these seals. In this way, a good platinum casing is achieved, in a simple and inexpensive manner, on the materials that are to be protected. This casing is gas-tight with respect to the shaft end of the stirring element.

The invention will be elucidated in more detail in the following section on the basis of diagrams.

A stirrer apparatus for glass melts comprises a stirring element (1) and a drive shaft (2). The stirring element is comprised of an impeller (4) that is attached to a stirrer shaft element (3). In one embodiment, molybdenum is used as the material for the stirring element (1) rendering it extremely resistant to corrosive attack by the glass melt.

The upper end portion of the stirrer shaft (3) of the stirring element (1) has a lug (7) with an external thread, which is screwed into an appropriate recess (8) having an internal thread in the lower end portion of a drive shaft (2) for driving the stirring element (1). A seal-retaining shoulder is formed in the stirrer shaft (3) at the base of the lug. In the embodiment shown, the drive shaft (2) is located outside the glass melt and in the oven's atmosphere and extends through the lid of the glass melting oven and is driven from outside the oven. (Not shown in the diagrams). The drive shaft (2) is fabricated from an oxide dispersion strengthened iron-based alloy that is extremely resistant to corrosive attack from the oven's atmosphere. The junction between the drive shaft (2) and the stirring element (1) is located just above the normal operating level (11) of the glass melt, which occurs during use of the glass stirrer. A platinum casing (5) is disposed over the outer surface of the stirrer shaft element (3) and extends vertically above and below the normal operating level (11) of the glass melt.

Figure 2:
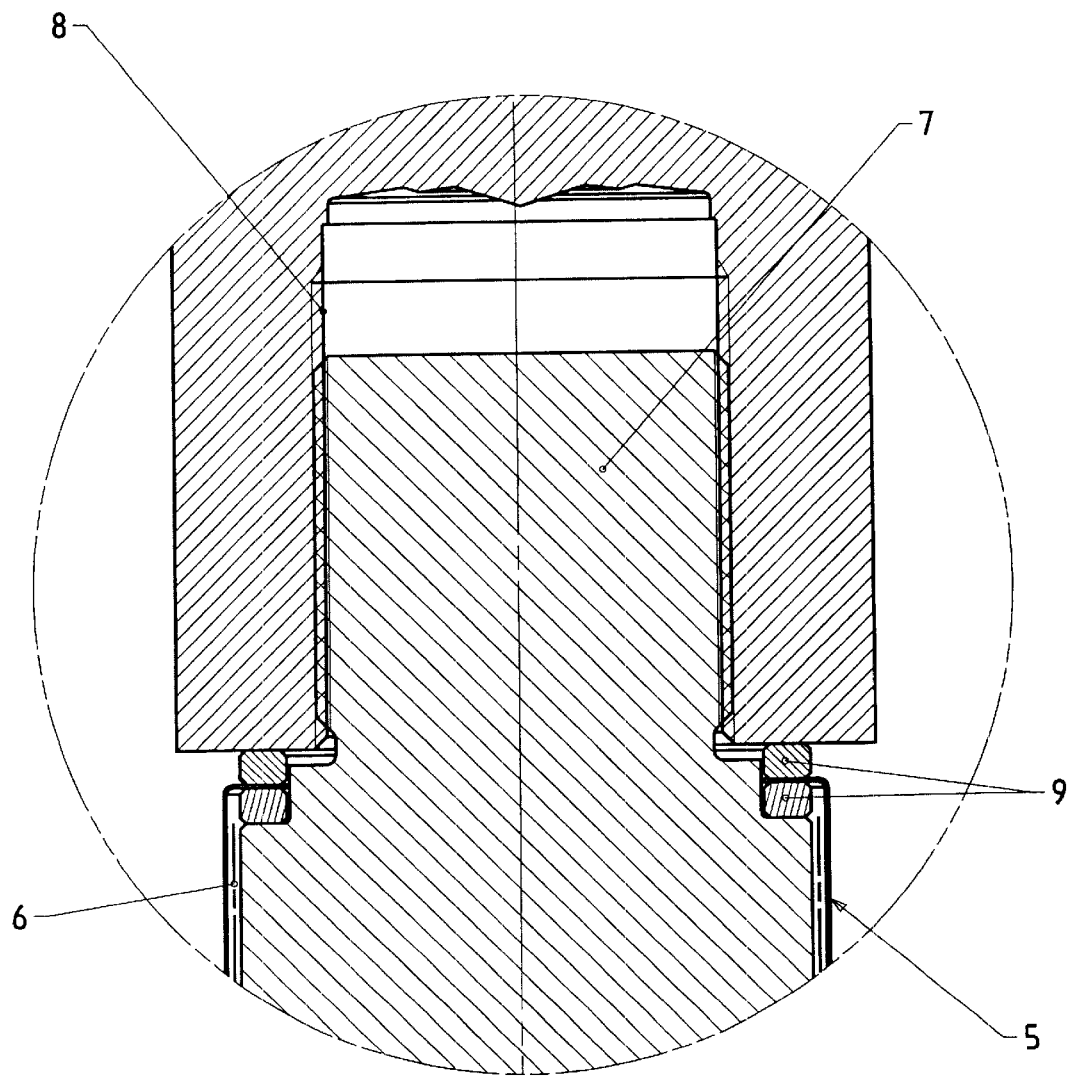
FIG. 2, is an enlarged sectional view, showing a junction in the stirrer apparatus in accordance with FIG. 1.

One embodiment of the junction is shown in the enlarged illustration in FIG. 2. Two ring-shaped ceramic sealing elements (9) are arranged between the front face at the end of the drive shaft (2) and the front surface of the stirrer shaft element (3) radially outward of the lug (7) of the stirring element (1) at the seal-retaining shoulder. The platinum casing (5) has an inwardly-flanged end portion which is arranged between these ceramic sealing elements (9). In order to avoid diffusion of glass melt material at the points of contact of the platinum casing (5) with the molybdenum of the stirring element (1), the surfaces of the stirrer shaft element (3) are provided locally with a diffusion barrier layer (6) comprising aluminum oxide. The diffusion barrier layer (6) is provided at least locally to areas of contact with the platinum casing (5). Alternatively, the diffusion barrier layer can be applied to either of the adjustment surfaces where combinations of the drive shaft, stirrer shaft and/or platinum casing are in contact. When screwing the lug (7) into the recess (8), the platinum casing (5) is firmly clamped in a gas-tight manner, via its flanged edge, between the ceramic sealing elements (9), so that the end of the stirrer shaft element (3) of the stirring element (1) remains isolated from the oven's atmosphere even in the event of a decrease in the level (11) of the glass melt.

Although the invention has been shown and described with respect to a best mode embodiment thereof, it should be understood by those skilled in the art that the foregoing and various other changes, omissions, and additions in the form and detail thereof may be made therein without departing from the spirit and scope of the invention.

We claim:

1. A stirrer apparatus for stirring a glass melt comprising:
   a stirring element comprising an impeller and a shaft element, both made of a refractory metal or a refractory metal alloy as a first metal;
   a drive shaft constructed of a second non-refractory metal or alloy, said shaft element and said drive shaft each having an end portion, the end portion of the shaft element being adapted to mechanically attach to the end portion of the drive shaft; and
   a casing made of platinum and disposed over at least one of the end portions of the shaft element and the drive shaft over a length suitable to isolate at least one of said end portions against corrosive attack from the glass melt within a range of surface levels of the glass melt, said casing not extending substantially above a maximum level of the glass melt and not extending substantially below a minimum level of the glass melt.

2. The stirrer apparatus of claim 1 wherein the drive shaft end portion is wholly adapted to be above a highest operating level of the glass melt during use.

3. The stirrer apparatus of claim 1 wherein the stirrer shaft is wholly adapted to be below a lowest operating level of the glass melt during use.

4. The stirrer apparatus of claim 1 wherein the first metal is selected from the group of materials consisting of molybdenum and molybdenum alloys.

5. The stirrer apparatus of claim 1 wherein the second metal is selected from the group of materials consisting of oxide dispersion strengthened alloys based on iron and nickel.

6. The stirrer apparatus of claim 5 wherein the second metal further comprises aluminum as an alloying element.

7. The stirrer apparatus of claim 1 further comprising a diffusion barrier layer disposed on a contact surface located at an area between any two of the group consisting of the stirrer shaft, the drive shaft, and the casing.

8. The stirrer apparatus of claim 7 wherein the diffusion barrier layer comprises an aluminum oxide layer.

9. The stirrer apparatus of claim 1, further comprising a pair of ring-shaped seals,
   the end portion of the stirrer shaft comprising an externally-threaded lug and a seal-retaining shoulder;
   the end portion of the drive shaft further comprising an internally-threaded recess; and
   the casing further comprising an inwardly-directed flange,
   wherein the stirrer shaft is attached to the drive shaft by screwing the lug into the recess,
   wherein the ring-shaped seals are sealably disposed in a seal-retaining shoulder in axial contact with one another, and
   wherein the inwardly-directed flange is sealably disposed between the seals.

* * * * *